(12) United States Patent
Kim (10) Patent No.: US 6,671,761 B2
(45) Date of Patent: Dec. 30, 2003

(54) BUS SYSTEM

(75) Inventor: Jin-soo Kim, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 455 days.

(21) Appl. No.: 09/817,756

(22) Filed: Mar. 27, 2001

(65) Prior Publication Data

US 2002/0023186 A1 Feb. 21, 2002

(30) Foreign Application Priority Data

Aug. 11, 2000 (KR) ........................................ 2000-46658

(51) Int. Cl.⁷ ........................ G06F 13/18; G06F 13/362
(52) U.S. Cl. ........................ 710/244; 710/107; 710/36; 710/41; 710/240; 710/241; 710/58
(58) Field of Search ............................... 710/1, 5, 6, 28, 710/36, 40, 41, 58, 107, 113, 116, 240, 241, 244; 711/100

(56) References Cited

U.S. PATENT DOCUMENTS

| 5,293,500 | A | * | 3/1994 | Ishida et al. ................. 712/217 |
| 5,467,295 | A | * | 11/1995 | Young et al. ................ 709/210 |
| 5,572,734 | A | * | 11/1996 | Narad et al. ................. 710/200 |
| 5,884,052 | A | * | 3/1999 | Chambers et al. ........... 710/107 |
| 6,081,859 | A | * | 6/2000 | Munguia ..................... 710/107 |
| 6,275,890 | B1 | * | 8/2001 | Lee et al. .................... 710/317 |
| 6,289,406 | B1 | * | 9/2001 | Chambers et al. ........... 710/107 |
| 6,393,506 | B1 | * | 5/2002 | Kenny ........................ 710/113 |
| 6,513,089 | B1 | * | 1/2003 | Hofmann et al. ............ 710/309 |

FOREIGN PATENT DOCUMENTS

| JP | 54-76027 | 6/1979 |
| JP | 55-56221 | 4/1980 |
| JP | 63-155249 | 6/1988 |
| JP | 1-226062 | 9/1989 |
| JP | 2-101560 | 4/1990 |
| JP | 4-15741 | 1/1992 |
| JP | 4-278651 | 10/1992 |
| JP | 6-90243 | 3/1994 |
| JP | 6-139188 | 5/1994 |
| JP | 8-44662 | 2/1996 |
| JP | 10-11356 | 1/1998 |

OTHER PUBLICATIONS

"Real–Time Self–Granting, Centrally Directed Distributed Arbitration with Fairness" IBM Technical Disclosure Bulletine, Mar. 1995, vol. 38, Issue 3, pp. 421–424.*

* cited by examiner

Primary Examiner—Xuan M. Thai
(74) Attorney, Agent, or Firm—Sughrue Mion, PLLC

(57) ABSTRACT

A bus system is provided. The bus system includes: an arbiter that receives access commands output from the plurality of master devices and outputs the access commands in an order according to a predetermined arbitration algorithm; an execution scheduler that receives the access commands from the arbiter and outputs the access commands in the order in which execution preparation by corresponding slave devices are complete; a plurality of command execution controllers corresponding to at least one of the slave devices, respectively, each command execution controller stores two or more access commands input from the execution scheduler, extracts access information necessary for execution from the stored access commands, controls the output order of the access commands based on the result of comparing the extracted access information with access information about the command currently being executed so that the total execution time of the stored commands is shorter than the total execution time according to the order in which the commands are input; and a plurality of pseudo-delayers corresponding to at least one of slave devices, respectively, each pseudo-delayer delays and outputs the access command received from the command execution controller to a corresponding slave device so that the latency period of the corresponding slave device may equal the longest of latency periods of the plurality of slave devices. Accordingly, the number of idle clock cycles of a data bus is reduced and the overall system efficiency is improved.

43 Claims, 8 Drawing Sheets

BUS SYSTEM

BACKGROUND OF THE INVENTION

1. Field of the Invention

The present invention relates to a bus system, and more particularly, to a bus system in which efficiency for a data bus is improved by adjusting the order of execution of access commands and the point in time and order of execution of access commands delivered to each slave device. The present application is based on Korean Patent Application No. 2000-46658, which is incorporated herein by reference.

2. Description of the Related Art

An arbiter is used to arbitrate access to a bus. In conventional bus systems, an arbiter receives requests for access to a bus from a plurality of master devices, arbitrates the bus access requests according to a specific arbitration algorithm, and grants control of the bus to the master devices ("masters") based on the arbitration result. Once a master's request has been granted, the master may take control of the bus until the master has completed its transfer of data with a corresponding slave device. Here, the bus may include an address/control bus and a data bus.

A currently used bus system adopts a high-speed memory such as synchronous DRAM (SDRAM) as a slave device. In the case of high-speed memory such as SDRAM, it does not access an access/control bus concurrently with a data bus. That is, if an address/control signal such as an address or read/write flag is input to SDRAM, data is output or input after a predetermined latency period has lapsed. Thus, a master device actually takes control of an address/control bus or a data bus for a shorter period than is expected. According to the conventional arbitration system in which access to or control of both address/control bus and data bus is granted simultaneously for a predetermined time, there are a large number of idle clock cycles of the address/control bus and data bus, which degrades the efficiency of bus access.

An arbiter adopting the fixed priority scheme is simple to design, but the arbiter cannot be employed if the priority level assigned needs to be modified during operation of a bus system. Arbitration according to the priority designation scheme is advantageous in supporting a master device which frequently transmits and receives data across a bus, if necessary.

However, the priority designation scheme has a problem in that hardware is large and complicated compared to a fixed priority scheme or a round robin algorithm giving each master device equal chances to access or control the bus. More specifically, the priority designation is performed by comparing each input port, to which a bus request is input from each master device, to look for the input port having the highest priority. Thus, for example, if the number of input ports is 3 or 4, three or six comparators are needed. That is, a number nC2 of comparators are needed for a number N of input ports, where nC2 represents "n(n−1)/n!". An increase in the number of master devices increases the number of comparators significantly, which may result in an extremely large arbiter circuit and slow arbitration speed. As a consequence, to achieve an arbiter circuit of an appropriate size and high arbitration speed, the number of master devices must be restricted.

SUMMARY OF THE INVENTION

To solve the above problems, it is an objective of the present invention to provide a bus system having improved data transfer efficiency by reducing the number of idle clock cycles of a data bus.

It is another objective of the present invention is to provide an arbiter providing a priority designation scheme without restriction on the number of master devices, and a bus system using the arbiter.

Accordingly, to achieve the above objectives, the present invention provides a bus system including a plurality of master devices and a plurality of slave devices, at least one of the slave devices having a latency period. The bus system includes: an arbiter that receives access commands output from the plurality of master devices and outputs the access commands in an order according to a predetermined arbitration algorithm; an execution scheduler that receives the access commands from the arbiter and outputs the access commands in the order in which execution preparation by corresponding slave devices are complete; a plurality of command execution controllers corresponding to at least one of the slave devices, respectively, each command execution controller stores two or more access commands input from the execution scheduler, extracts access information necessary for execution from the stored access commands, controls the output order of the access commands based on the result of comparing the extracted access information to access information from the command currently being executed, so that the total execution time of the stored commands is shorter than the total execution time according to the order in which the commands are input; and a plurality of pseudo-delayers corresponding to at least one of slave devices, respectively, each pseudo-delayer delays and outputs the access command received from the command execution controller to a corresponding slave device so that the latency period of the corresponding slave device may equal the longest of latencyperiods of the plurality of slave devices.

The arbiter includes a bus request receiver, connected to the plurality of master devices, for receiving bus request inputs from the master devices, a priority level extractor for outputting priority level signals indicating predesignated priority levels corresponding to the master devices if the bus requests are input through the bus request receiver, and generating a priority level summation signal indicating all priority levels of the bus requests based on the output priority level signals, a priority output unit for outputting priority levels in order of decreasing priority based on the priority level summation signal generated by the priority level extractor, a priority mapper, including an identifier output unit for outputting identifiers of the master devices submitting bus requests based on the priority level signals, and an arbitration circuit that grants bus access to the master device having the identifier output from the priority mapper in order for the master device granting the bus access to output the access command.

Preferably, the bus request receiver comprises a plurality of input ports connected to the plurality of master devices for receiving bus request inputs from the master devices, and a plurality of registers provided in the input ports for storing priority levels designated at the input ports.

Preferably, the priority level signal is represented using the same number of bits as the priority level. The priority level extractor performs an OR operation on one or more priority level signals on a bit-by-bit basis and generates the priority level summation signal, which is represented in the same number of bits as the priority level signal. The OR operation is based on negative logic.

Preferably, the master device identifier output unit includes an identifier extractor that generates an identifier signal by extracting a bit column including a bit indicating a priority level requested from a matrix constructed of the priority level signals and extracts a corresponding master device identifier based on the generated identifier signal, and an identifier output unit that outputs an identifier of the master device having the priority level output from the priority output unit, wherein the identifier is one of the identifiers extracted by the identifier extractor. The identifier extractor includes decoders that receive input identifier signals and extract corresponding master device identifiers.

Preferably, the execution scheduler includes an access command distributor that receives the access commands output from the arbiter and transmits the access commands to the corresponding command execution controllers, and an execution scheduling unit that send outs an execution starting signal of the transmitted access command to the command execution controller corresponding to the pseudo-delayer that has received an execution preparation completion signal, wherein the pseudo-delayer is one of the pseudo-delayers that have received the access commands from the access command distributor.

Preferably, the execution scheduling unit includes an identifier storage queue including one or more storage cells as an identifier storage unit for storing an identifier of a corresponding slave device receiving the access command through the access command distributor and an identifier storage queue controller for controlling the identifier storage queue, comparators, each of which corresponds to a respective storage cell, for determining whether or not an identifier stored in the storage cell is the same as an identifier of the slave device transmitting the execution preparation completion signal, and a decoder for transmitting the execution starting signal to the pseudo-delayer which has received the execution preparation completion signal, if both identifiers are determined to be the same by the comparator.

Preferably, the access command distributor comprises a command storage queue for storing the access commands received from the arbiter and a command storage queue controller for controlling the command storage queue.

Each command execution controller includes a command holder for storing two or more access commands received from the access command distributor, an access information extractor for extracting access information for execution from the access commands stored in the command storage unit, an execution access information storage unit for storing access information about an access command currently being executed by the slave device, a comparison unit for comparing the access information extracted by the access information extractor with access information stored in the execution access information storage unit, and an output order controller that controls the output order of the access commands stored in the command holders based on the comparison result from the comparison unit so that the total execution time of the stored commands is shorter than the total execution time according to the order in which the commands are stored and outputs the access commands to the pseudo-delayer according to the controlled output order.

Preferably, the command holder includes a command storage queue, including a plurality of storage cells for storing the access commands, and the access information extractor comprises a plurality of information extractors for extracting the access information, each of which corresponds to a respective storage cell. The execution access information storage unit includes a register for storing the access information about the access command currently being executed, and the comparison unit includes a plurality of comparators for comparing the access information extracted by the access information extractor with the access information stored in the register, each of which corresponds to a respective access information extractor. The output order controller includes an output order control circuit for controlling an output order according to priority that is granted based on the comparison results from the comparators and a multiplexer for outputting the access commands stored in the command storage unit according to the output order from the output order control circuit.

Preferably, the access information includes a bank address and a row address, and the comparison unit compares a bank address and a row address extracted by each information extractor with a bank address and a row address stored in the register. The output order control circuit grants first priority to the access command whose bank address and row address are the same as those stored in the register as a result of the comparison, while it grants second priority to the access command whose bank address is different from that stored in the register as a result of the comparison. The access information further includes a burst length, which is the bit length of burst transmission data.

Preferably, each pseudo-delayer includes a storage unit for storing the number of delay clock cycles which correspond to the difference between the longest of the latency periods and the latency period of each slave device, receiving the access command from the corresponding command execution controller, and transmitting the access command to the corresponding slave device after a number of delay clock cycles corresponding to the number stored in the storage unit have lapsed.

The present invention also provides a bus system including a plurality of master devices and a plurality of slave devices, at least one of the slave devices having a latency period. The bus system includes: an arbiter that receives access commands output from the plurality of master devices and outputs the access commands in an order according to a predetermined arbitration algorithm; an execution scheduler that receives the access commands from the arbiter and outputs the access commands in the order in which execution preparation by corresponding slave devices are complete; a plurality of command storage units corresponding to the plurality of slave devices, each of the command storage units storing one or more access commands received from the execution scheduler and outputting the access commands in the order that the commands are input; and a plurality of pseudo-delayers corresponding to at least one of the slave devices, respectively, each pseudo-delayer that delays and outputs the access command received from the command storage unit to a corresponding slave device so that the latency period of the corresponding slave device may equal the longest of latency periods of the plurality of slave devices.

The arbiter includes: a bus request receiver, connected to the plurality of master devices, for receiving bus request inputs from the master devices; a priority level extractor for outputting priority level signals indicating predesignated priority levels corresponding to the master devices if the bus requests are input through the bus request receiver, and generating a priority level summation signal indicating all priority levels of the bus requests based on the output priority level signals; a priority output unit for outputting priority levels in order of decreasing priority based on the priority level summation signal generated by the priority level extractor; a priority mapper, including an identifier output unit for outputting identifiers of the master devices submitting bus requests based on the priority level signals;

and an arbitration circuit that grants bus access to the master device having the identifier output from the priority mapper in order for the master device granting the bus access to output the access command.

Preferably, the bus request receiver comprises a plurality of input ports connected to the plurality of master devices for receiving bus request inputs from the master devices, and a plurality of registers provided in the input ports for storing priority levels designated at the input ports. The priority level signal is represented using the same number of bits as the priority level.

Preferably, the priority level extractor performs an OR operation on one or more priority level signals on a bit-by-bit basis and generates the priority level summation signal represented in the same number of bits as the priority level signal. The master device identifier output unit includes an identifier extractor that generates an identifier signal by extracting a bit column including a bit indicating a priority level requested from a matrix constructed of the priority level signals and extracts a corresponding master device identifier based on the generated identifier signal, and an identifier output unit that outputs an identifier of the master device having the priority level output from the priority output unit, wherein said identifier is one of the identifiers extracted by the identifier extractor. The identifier extractor includes decoders that receive input identifier signals and extract corresponding master device identifiers.

Preferably, the execution scheduler includes an access command distributor that receives the access commands output from the arbiter and transmits the access commands to the corresponding command storage unit, and an execution scheduling unit that send outs an execution starting signal of the transmitted access command to the command storage unit corresponding to the pseudo-delayer that has received an execution preparation completion signal, wherein the pseudo-delayer is one of the pseudo-delayers that have received the access commands from the access command distributor.

Preferably, the execution scheduling unit includes an identifier storage queue including one or more storage cells as an identifier storage unit for storing an identifier of a corresponding slave device receiving the access command through the access command distributor and an identifier storage queue controller for controlling the identifier storage queue, comparators, each of which corresponds to a respective storage cell, for determining whether or not an identifier stored in the storage cell is the same as an identifier of the slave device transmitting the execution preparation completion signal, and a decoder for transmitting the execution starting signal to the pseudo-delayer which has received the execution preparation completion signal, if both identifiers are determined to be the same by the comparator.

Preferably, the access command distributor includes a command storage queue for storing the access commands received from the arbiter and a command storage queue controller for controlling the command storage queue. Each command storage unit comprises an execution command storage queue for storing the access commands and an execution command storage queue controller for controlling the execution command storage queue.

Preferably, each pseudo-delayer includes a storage unit for storing the number of delay clock cycles which correspond to the difference between the longest of the latency periods and the latency period of each slave device, receives the access command from the corresponding command storage unit, and transmits the access command to the corresponding slave device after a number of delay clock cycles corresponding to the number stored in the storage unit have lapsed.

BRIEF DESCRIPTION OF THE DRAWINGS

The above objectives and advantages of the present invention will become more apparent by describing in detail a preferred embodiment thereof with reference to the attached drawings in which.

DETAILED DESCRIPTION OF THE INVENTION

Figure 1:
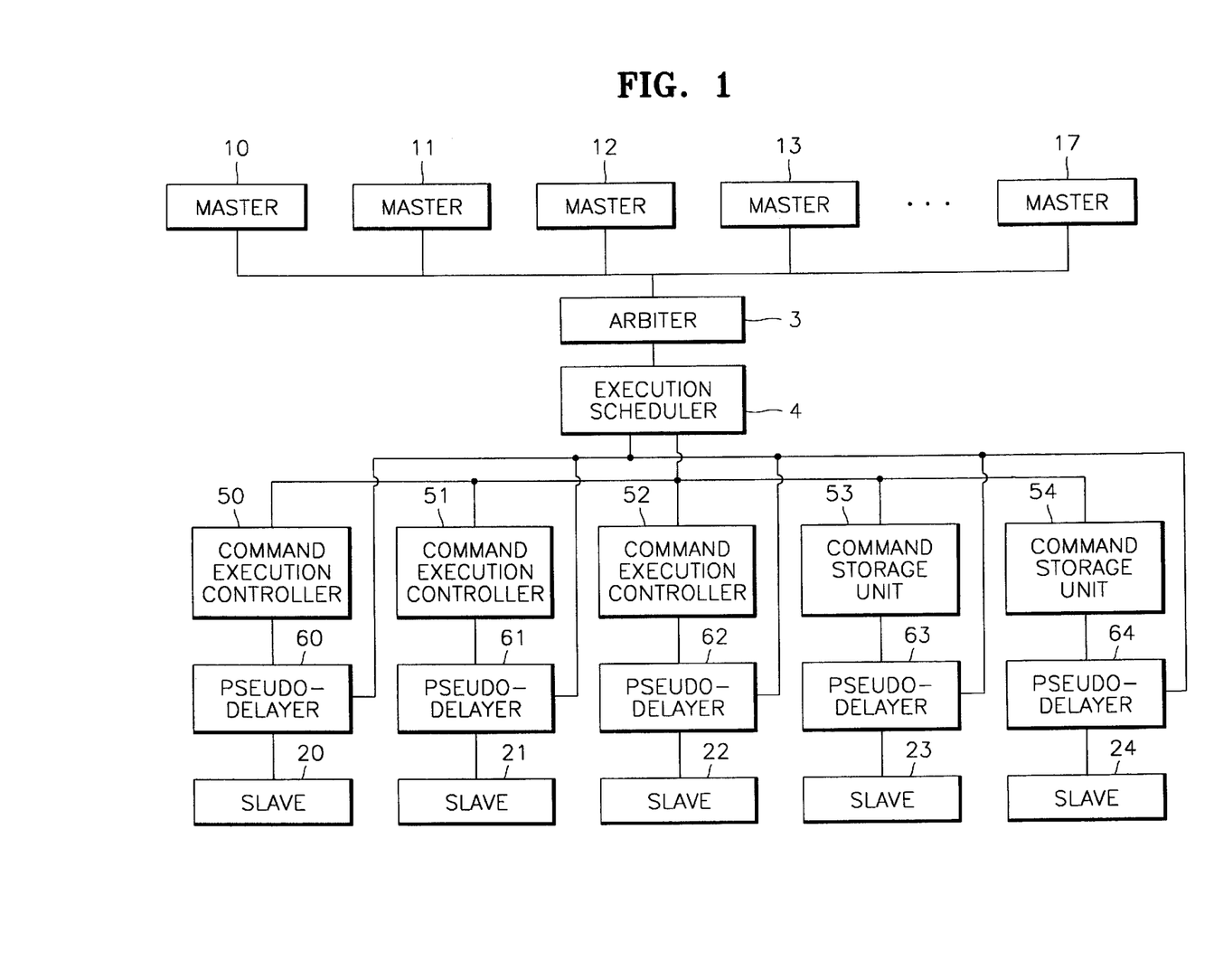
FIG. 1 is a schematic diagram showing a bus system according to a preferred embodiment of the present invention.

Referring to FIG. 1, a bus system according to a preferred embodiment of the present invention includes a plurality of master devices 10–17, a plurality of slave devices 20–24, and an arbiter 3, an execution scheduler 4, and a plurality of command execution controllers 50, 51 and 52, command storage units 53 and 54, and a plurality of pseudo-delayers 60–64. The plurality of master devices 10–17 and the plurality of slave devices 20–24 are interconnected by a common data bus which is not shown. The data bus may include a main data bus and a local data bus which function at different transfer speeds.

The master devices 10–17 generally refer to a processor or a direct memory access (DMA) device, and the slave devices 20–24 refer to memory, such as RAM, ROM, SDRAM, and RDRAM, an I/O device, or other peripheral devices. In this embodiment, the slave devices 20, 21, and 22 are SDRAMs that allow for a high data transfer, and the remaining slave devices 23 and 24 have no latency period for data transfer. A representative example of a device having no latency period is a ROM.

The arbiter 3 grants access to the address/control bus and the data bus, to the master device 10, 11, . . . , or 17 having the highest priority among the mater devices 10–17 submitting bus requests, based on a priority designation scheme, which makes it possible to change the priority level of each master device 10, 11, . . . , or 17. The execution scheduler 4 sends out an access command transmitted from the arbiter 3 to a corresponding command execution controller 50, 51, or 52 or a command storage unit 53 or 54, and then allows the slave device 20, 21, 22, 23, or 24, to execute the access command in the order that an execution preparation is completed. In this case, the access command includes access information necessary for data transfer such as an address, an identifier of a corresponding master device, and a burst length, which is the bit length of burst transmission data. Execution of the access command means that the transfer of data intended by an access command has been completed.

The command execution controllers 50, 51, and 52 are provided corresponding to the slave devices 20, 21, and 22, respectively. The command execution controllers 50, 51, and 52 receive access commands from the execution scheduler 4, control the execution order of the received access commands, and output the access commands to the pseudo-delayers 60, 61, and 62, respectively. The command storage units 53 and 54 corresponding to the slave devices 23 and 24 output access commands to the pseudo-delayers 63 and 64, respectively, in the order that the access commands are received from the execution scheduler 4.

The pseudo-delayers 60–64 correspond to the slave devices 20–24, and each of the pseudo-delayers 60–64 transmit the access command received from the command execution controllers 50, 51, and 52 or the command storage units 53 and 54, to a corresponding slave device 20, 21, 22, 23, or 24 after a predetermined number of clock cycles have lapsed.

Meanwhile, each of the pseudo-delayers 60–64 transmit a pseudo execution completion signal informing that execution of the access command has been completed; that is, data transfer to the execution scheduler has been completed at a point in time that is a number of clock cycles corresponding to a predetermined latency period, in advance of the real completion of data transfer according to the access command. The real completion of data transfer can be determined by a burst length contained in the command.

Figure 2:
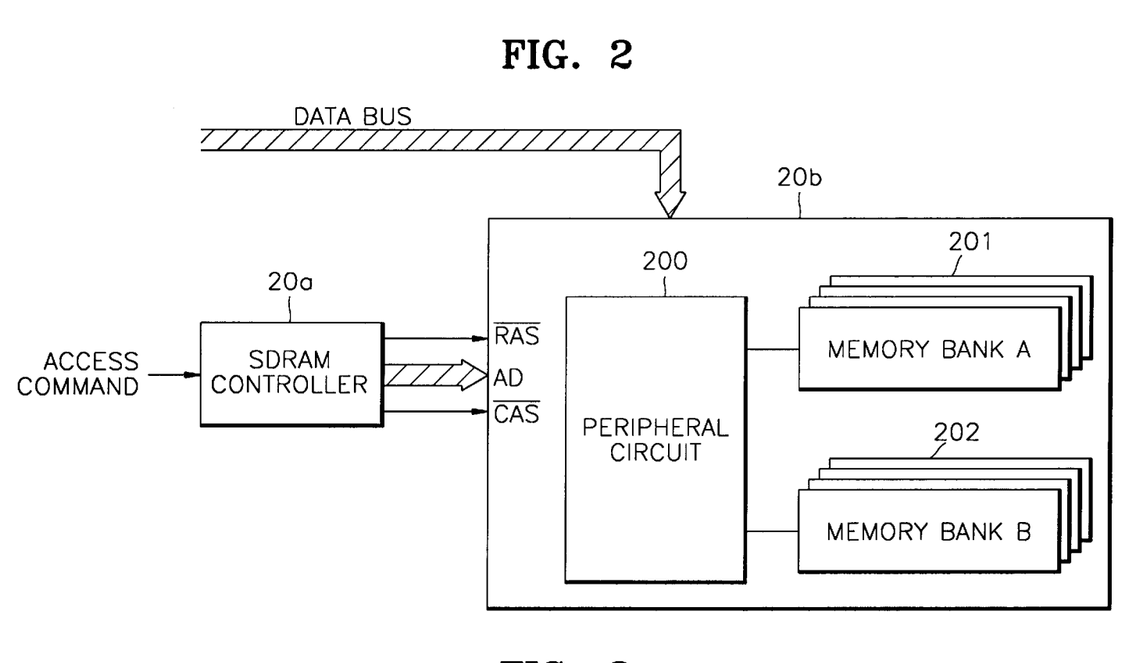
FIG. 2 is a detailed block diagram of the slave of FIG. 1

FIG. 2 is a detailed block diagram of the slave device 20 of FIG. 1. The slave devices 21 and 22 has the same configuration as the slave device 20. Referring to FIG. 2, the slave 20 includes a SDRAM controller 20a and a SDRAM 20b. The SDRAM 20b includes a memory bank A 201 and a memory bank B 202, each of which includes a plurality of memory cells, and a peripheral circuit 200 for controlling the memory bank A 201 and the memory bank B 202. The memory bank A 201 and the memory bank B 202 send and receive data using a common port, which is not shown.

The SDRAM controller 20a, coupled to the SDRAM 20b, sends various control signals to the SDRAM 20b. The SDRAM controller 20a receives an access command from a corresponding pseudo-delayer 60 and transmits to the SDRAM 20b signals necessary for accessing the memory bank A 201 or the memory bank B 202 to execute the access command based on the received access command. The transmitted signals include a chip select signal CS#, a row address strobe RAS#, a column address strobe CAS#, a data address AD (row address and column address), a memory bank address BA, a read/write select signal W#, and a data output/input enable signal. For simplification, only lines for RAS, CAS, and data address AD are indicated.

The SDRAM controller 20a is coupled to the corresponding pseudo-delayer 60 according to the preferred embodiment of the present invention. The pseudo-delayer 60 receives the access command from the command execution controller 50, controls the execution order of the received access commands, and outputs the access commands to the SDRAM controller 20a based on the controlled execution order of the access commands.

Figure 3:
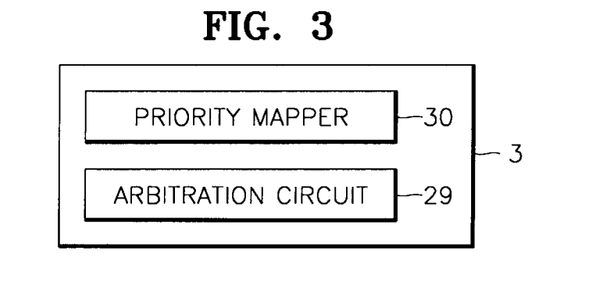
FIG. 3 is a block diagram of the arbiter of FIG. 1.

FIG. 3 is a block diagram of the arbiter 3 of FIG. 1. Referring to FIG. 3, the arbiter 3 includes a priority mapper 30 and an arbitration circuit 29. If bus requests are input from one or more master devices 10–17, the priority mapper 30 outputs an identifier identifying the master device 10, 11, . . . , or 17 having the highest priority bus request amongst the input bus requests according to a predesignated priority level. The arbitration circuit 29 grants the bus to the master device 10, 11, . . . , or 17 having the identifier output from the priority mapper 30.

Figure 4:
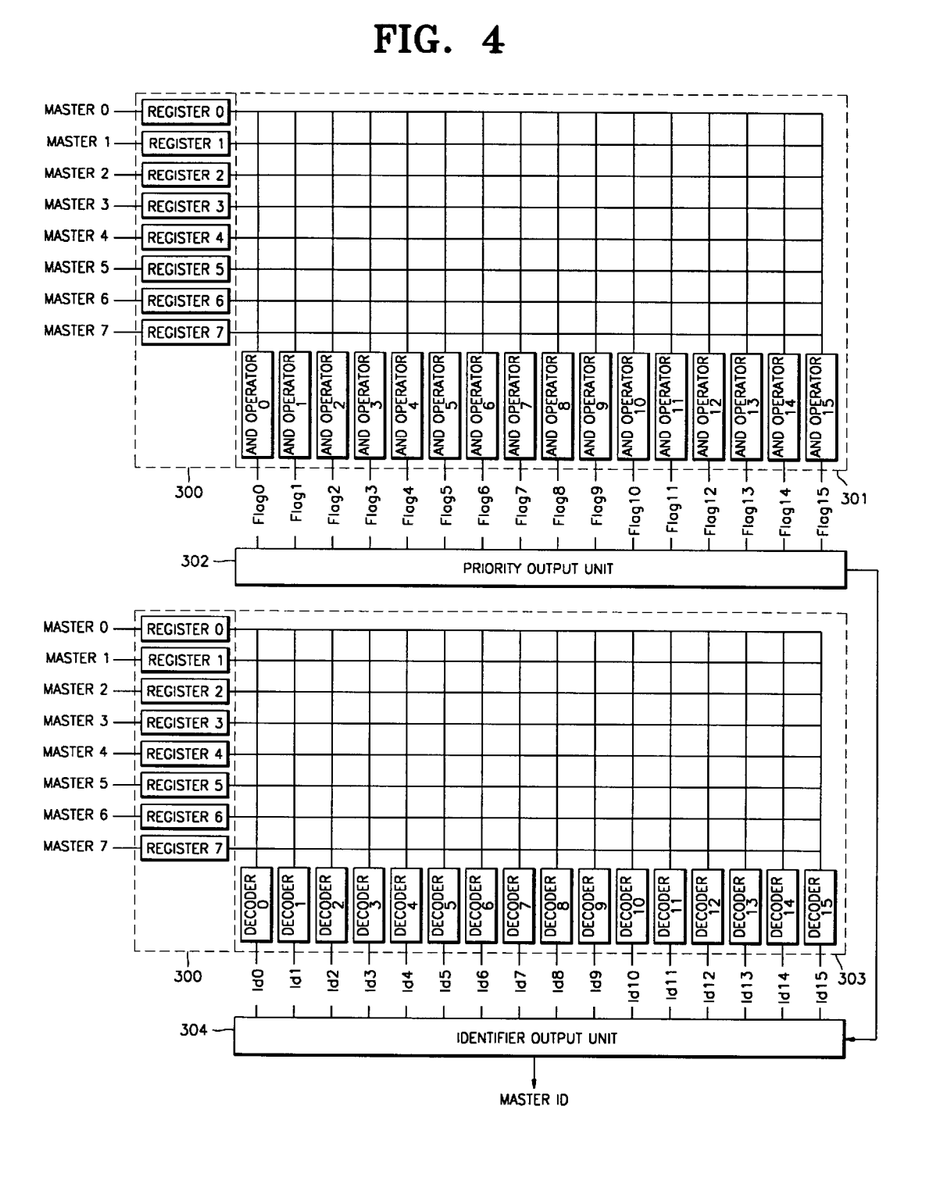
FIG. 4 is a detailed block diagram of the priority mapper of FIG. 3.

FIG. 4 is a detailed block diagram of the priority mapper 30 of FIG. 3. Referring to FIG. 4, the priority mapper 30 includes a bus request receiver 300, a priority level extractor 301, a priority output unit 302, an identifier extractor 303, and an identifier output unit 304. The bus request receiver 300 includes a plurality of input ports connected to the master devices 10–17, respectively, which are capable of designating priorities and receiving bus requests from the master devices 10–17. Furthermore, if one or more bus requests are input through the input ports, the bus request receiver 300 outputs priority level signals indicating priority levels designated at the corresponding input ports to which the bus requests are input. The priority levels designated for the corresponding input ports are stored in corresponding registers. The priority level extractor 301 outputs a priority level summation signal indicating all priority levels of the input ports, to which the bus requests are input, based on the priority level signals output from the bus request receiver 300.

Since the bus system according to this embodiment includes eight master devices 10–17, eight input ports and eight registers 0–7 are provided in the bus request receiver 300. Furthermore, since priority according to this embodiment is classified into sixteen priority levels, one priority level signal is represented in 16 bits, and thus sixteen OR operators 0–15 are provided in the priority level extractor 301 in order to perform an OR operation on each bit of the priority level signal.

The priority output unit 302 outputs priority levels in order of decreasing priority based on the priority level summation signal output from the priority level extractor 301. Based on the priority level signals output from the bus request receiver 300, the identifier extractor 303 generates identifier signals indicating master device identifiers that correspond to the priority levels indicated in the priority level signal, and decodes the generated identifier signals to extract corresponding master device identifiers. Sixteen decoders 0–15, each corresponding to a priority level, are provided in the identifier extractor 303 in order to decode the identifier signals. The identifier output unit 304 outputs a master device identifier having the priority level output by the priority output unit 302, wherein the master device identifier is one of the master device identifiers extracted by the identifier extractor 303.

For example, if the priority level of the master device 10 is 4 and that of the master device 11 is 6, priority level signals output from the bus request receiver 300 are 1110111111111111, and 1111101111111111, respectively. Thus, an OR operation is performed on the two priority level signals by the priority level extractor 301 on a bit-by-bit basis to output a priority level summation signal Flag0, . . . ,Flag15 as 1110101111111111. When viewed from the most significant bit (MSB), the fourth and sixth bits are "0", which means that bus requests having priority levels 4 and 6 are made. If the bus requests have a higher priority as a priority level is lower, the priority output unit 302, to which the priority level summation signal is input, initially outputs 4 and then 6. An 8*16 matrix is formed in such a way that a row vector 1110111111111111, which is a priority level signal, corresponds to the master device 10, a row vector 1111101111111111, which is a priority level signal, corresponds to the master device 11, and a row vector 1111111111111111 corresponds to the remaining master devices 12–17 submitting no bus requests. The matrix is as follows:

11101111111111
11111011111111
11111111111111
11111111111111
11111111111111
11111111111111
11111111111111
11111111111111

The priority levels of bus requests in the matrix are 4 and 6, and thus the identifier extractor 303 generates identifier signals 01111111 and 10111111 composed of column bits arranged at the same positions as the corresponding priority levels, decodes the generated identifier signals by decoder 4 and decoder 6, respectively, and extracts corresponding master device identifiers. The identifier signals are represented in 8 bits, each bit corresponding to one of the master devices 10–17 in the order beginning with the MSB. Thus, it can be seen that bus requests having the priority levels 4 and 6 are submitted by the master device 10 and the master device 11, respectively. The identifier extractor 303 then extracts identifiers of the master device 10 and the master device 11 and outputs the extracted identifiers to the identifier output unit 304. Of the two identifiers of the master device 10 and the master device 11 input from the identifier extractor 303, the identifier output unit 304 initially outputs the identifier of the master device 10 and then the identifier of the master device 11 based on the order of priority levels output from the priority output unit 302.

More generally, this will be described using expressions written in the C-language. First, the master device 10 may have a priority level stored in the register 0 ranging from 0 to 15, and thus a priority level signal may be one among the following sixteen cases.

Case (priority0)

0: priority level signal0=0b1111111111111110;
   1: priority level signal0=0b1111111111111101;
   2: priority level signal0=0b1111111111111011;
   3: priority level signal0=0b1111111111110111;
   4: priority level signal0=0b1111111111101111;
   5: priority level signal0=0b1111111111011111;
   6: priority level signal0=0b1111111110111111;
   7: priority level signal0=0b1111111101111111;
   8: priority level signal0=0b1111111011111111;
   9: priority level signal0=0b1111110111111111;
  10: priority level signal0=0b1111101111111111;
  11: priority level signal0=0b1111011111111111;
  12: priority level signal0=0b1110111111111111;
  13: priority level signal0=0b1101111111111111;
  14: priority level signal0=0b1011111111111111;
  15: priority level signal0=0b0111111111111111;
endcase
where 0b denotes a binary digit.

This is expressed in the same manner also in the master devices 11–17. A priority level summation signal indicates what priority levels bus requests have, and Flag0, . . . , Flag15, which comprise the priority level summation signal, are constructed as follows:

Flag0=priority level signal0 [0] or priority level signal1 [0]
  or priority level signal2 [0] or priority level signal3 [0]
  or priority level signal4 [0] or priority level signal5 [0]
  or priority level signal6 [0] or priority level signal7 [0]
  or priority level signal8 [0] or priority level signal9 [0]
  or priority level signal10 [0] or priority level signal11 [0]
  or priority level signal12 [0] or priority level signal13 [0]
  or priority level signal14 [0] or priority level signal15 [0]

The identifier signals 0–7 are generated by extracting each bit of a priority level signal and rearranging the extracted bits into a bit string.

Case (identifier signal0)
  0bddddddd0: Id0 <=0;
  0bdddddd01: Id0 <=1;
  0bddddd011: Id0 <=2;
  0bdddd0111: Id0 <=3;
  0bddd01111: Id0 <=4;
  0bdd011111: Id0 <=5;
  0bd0111111: Id0 <=6;
  0b01111111: Id0 <=7;
endcase
where d denotes "don't care". The remaining identifier signals 1–7 are constructed in the same manner.

Figure 5:
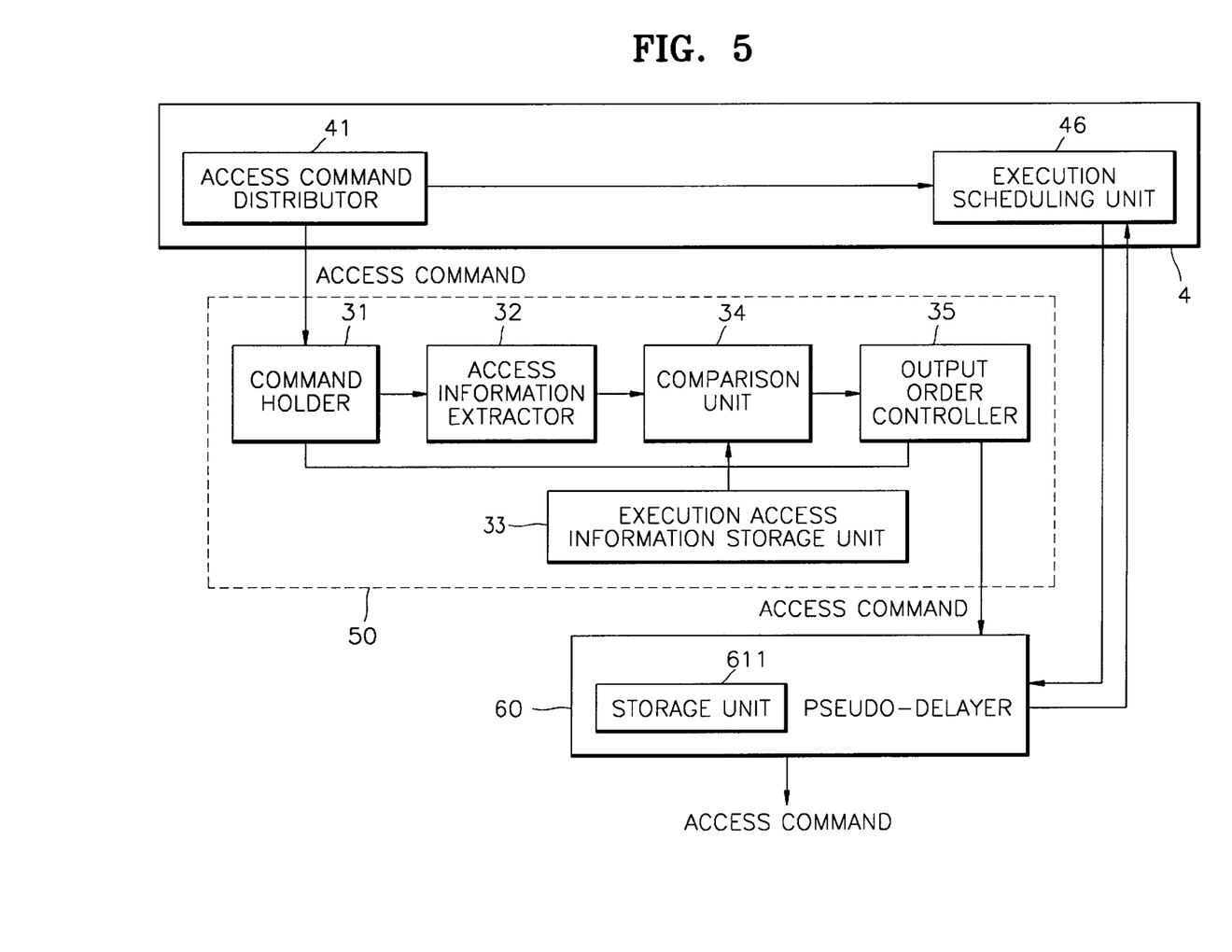
FIG. 5 is a block diagram for explaining the relationship between an execution scheduler 4, a command execution controller 50, and a pseudo-delayer 60.

FIG. 5 is a block diagram for explaining the relationship between the execution scheduler 4, the command execution controller 50, and the pseudo-delayer 60. The remaining command execution controllers 51 and 52, and the pseudo-delayers 61 and 62 also have the same configurations as the command execution controller 50 and the pseudo-delayer 60, respectively.

Referring to FIG. 5, the execution scheduler 4 includes an access command distributor 41 for transmitting an access command output from the arbiter 3 to the corresponding command execution controller 50, and an execution scheduling unit 46 for transmitting an execution starting signal of the access command to the pseudo-delayer 60 that sends out an execution preparation completion signal, wherein the pseudo-layer 60 is one of the pseudo-delayers 60–64 to which access commands are transmitted by the access command distributor 41.

The command execution controller 50 includes a command holder 31, an access information extractor 32, a comparison unit 34, an execution access information storage unit 33, and an output order controller 35. The command holder 31 stores two or more commands transmitted from the access command distributor 41. The access information extractor 32 extracts access information for execution from the command stored in the command holder 31. The execution access information storage unit 33 stores access information about the access command currently executed in the corresponding slave device 20. The comparison unit 34 compares the access information extracted by the access information extractor 32 with the access information stored in the execution access information storage unit 33. The output order controller 35 controls the output order of the commands stored in the command holder 31 based on the comparison result of the comparison unit 34 so that the total execution time of the stored commands may be shorter than the execution time according to the order that the commands are stored in the command holder 31 and outputs the command to the corresponding pseudode-layer 60.

The pseudo-delayer 60 includes a storage unit 611 in which the number of delay clock cycles corresponding to the slave 20 is stored. The pseudo-delayer 60 delivers the access command received from the command execution controller 50 to the corresponding slave device 20 after a number of delay clock cycles corresponding to the number of delay clock cycles stored in the storage unit 611 have lapsed. Here, the storage unit 611 may be implemented as a register. The pseudo-delayer 60 informs the master device 10, 11, 12, 13, 14, 15, 16, or 17, which has output the access commands transmitted to the pseudo-delayer 60, of a pseudo execution completion signal at a point in time that is a predetermined number of clock cycles in advance of the real execution completion, which is the time of real completion of data transfer, according to the access command output to the corresponding slave device 20.

Figure 6:
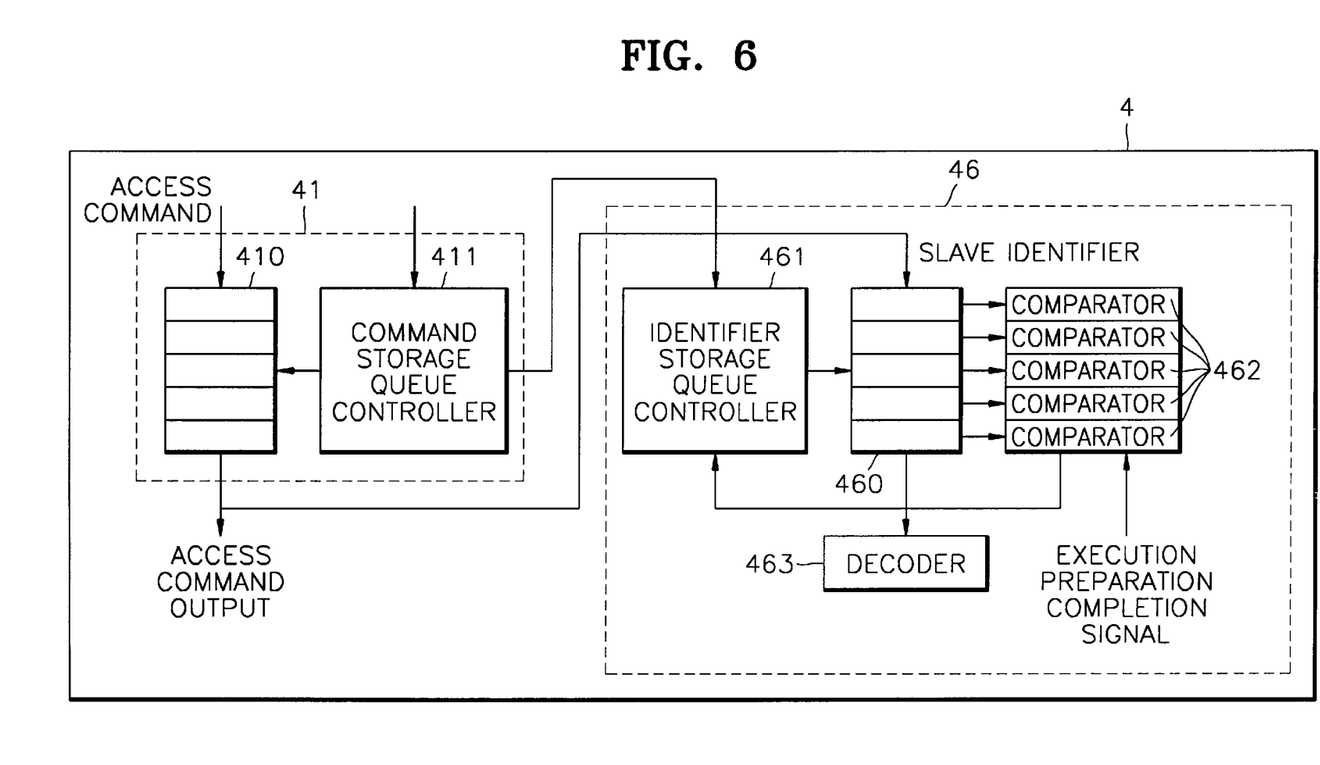
FIG. 6 is a detailed block diagram of the execution scheduler of FIG. 5.

FIG. 6 is a detailed block diagram of the execution scheduler 4 of FIG. 5. the access command distributor 41 of the execution scheduler 4 includes a command storage queue 410 and a command storage queue controller 411 for controlling the command storage queue 410 as a command storing unit for storing an access command received from the arbiter 3. The execution scheduling unit 46 of the execution scheduler 4 includes an identifier storage queue 460 as an identifier storing unit for storing identifiers of the slave devices 20–24 and an identifier storage queue controller 461, comparators 462, and a decoder 463.

The identifier storage queue 460 includes one or more storage cells for storing slave device identifiers contained in the access command transmitted through the access command distributor 41, and the identifier storage queue controller 461 controls the input and output of the identifier storage queue 460. Each comparator 462 provided for each storage cell, respectively, determines whether or not an identifier stored in each storage cell is identical to an identifier of the pseudo-delayer 60 that transmits an execution preparation completion signal. If both identifiers are determined to be the same by the comparator 462, then the decoder 463 transmits an execution starting signal to the pseudo-delayer 60 which has transmitted the execution preparation completion signal. In this case, the comparator 462 and the decoder 463 are named in a logical sense, and various circuital configurations thereof can be implemented.

Figure 7:
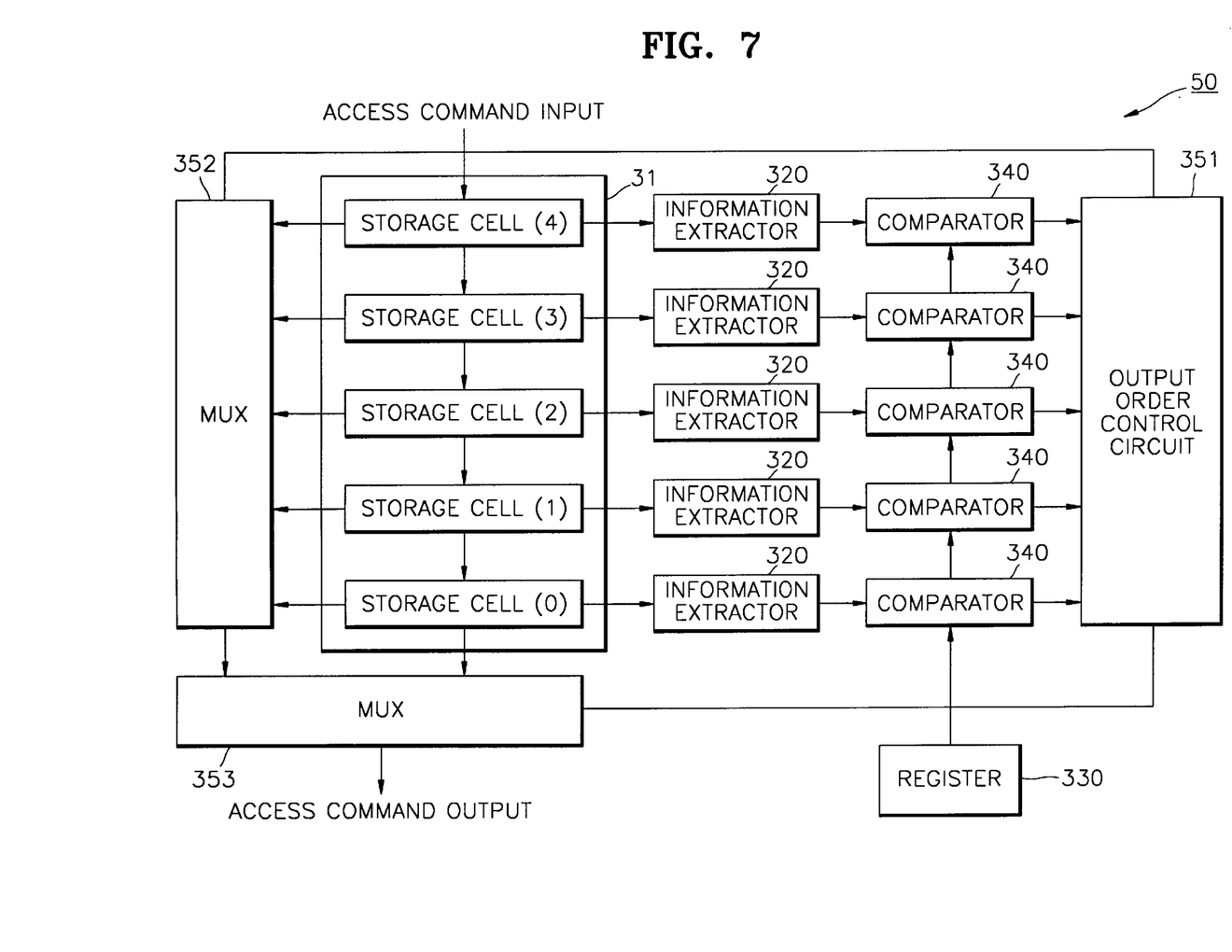
FIG. 7 is a detailed block diagram of the command execution controller 50 of FIG. 5.

FIG. 7 is a detailed block diagram of the command execution controller 50 of FIG. 5. The command execution controller 50 will be described in conjunction with the slave device 20 of FIG. 2 which is a SDRAM. This is because description of the slave device having a latency period will aid in understanding the command execution controller 50. Referring to FIG. 7, the command holder 31 is implemented as a command storage queue 310, including five storage cells for storing commands. Here, the number of storage cells for storing commands depends on the type of the specific application. The access information storage extractor 32 is implemented as a plurality of information extractors 320 corresponding to the storage cells. Access information refers to information necessary when the command stored in the corresponding storage cell accesses the memory bank A 201 or the memory bank B 202. The detailed access information to be extracted according to the preferred embodiment of the present invention includes a memory bank address and a row address of data to be transmitted for a read/write operation. The command is composed of a data field on which various kinds of information is recorded. Typically, a row address, a bank address, and a column address are allocated on a data field in order of an upper bit to a lower bit. Identifiers for identifying the master devices 10–17 are contained in the command. Here, the construction, arrangement, and the number of bits allocated related to the data field may be appropriately modified depending on the characteristic or specific application of the system.

The execution access information storage unit 33 is implemented as a register 330 for storing a memory bank address and a row address of a command currently executed in the memory bank A 201 or the memory bank B 202, received from the SDRAM controller 20a. The comparison unit 34 includes a plurality of comparators 340 for comparing the memory bank address and the row address extracted by the information extractors 320 with the memory bank address and the row address stored in the register 330, respectively. In this case, the comparators 340 are named in a logical sense, and various circuital configurations thereof can be implemented.

The output order controller 35 can be implemented as an output order control circuit 351 for executing an output order control algorithm, which will be described below, and multiplexers 352 and 353 connected to the command storage queue 310 for outputting the command stored in each storage cell according to the control result from the output order control circuit 351. The output order control circuit 351 grants the command first priority if both the memory bank address and the row address extracted by the information extractor 320 are the same as those stored in the register 330 as a result of comparison by the corresponding comparator 340. If the memory bank addresses are different from each other, the output order control circuit 351 grants the command second priority. Granting first priority to the command whose memory bank address and row address of the command are the same as those stored in the register 330 is attributed to the structural characteristic of SDRAM, which is the slave device 21 of FIG. 2. SDRAM selects a bank referring to the input bank address and row address, transfers all data stored in the row address of the selected bank to a buffer (memory bank activation or memory bank open), and reads or writes desired data referring to a column address. Thus, if the memory bank address and the row address of the command are the same as those stored in the register 330, there is no need to close a current memory bank (complete a precharge) and reopen the memory bank.

The control of an output order based on the priority granted will now be described. The command that is granted first priority among the commands held in the storage cells is first output, and then the command granted second priority is output. The remaining commands are output in the order that they are input. If the commands having same priority compete with each other, the commands are output in the same order that they are input. The result of controlling the output order is transmitted to the multiplexers 352 and 353, which in turn outputs the commands stored in the command storage queue 310 according to the controlled output order.

A process of transmitting and executing the access command will now be described based on the same configuration. First, referring to FIG. 4, a process of the arbiter 3 receiving an access command from the master devices 10–17 will now be described. The priority mapper 30 of the arbiter 3 receives bus requests from the master devices 10–17 by the bus request receiver 300. Next, priority level signals are generated based on priority levels assigned to the corresponding input ports provided in the bus request receiver 300. Then, the priority level extractor 301 performs an OR operation on the generated priority level signals on a bit-by-bit basis to generate a priority level summation signal. The priority output unit 302 outputs priority levels in order of decreasing priority based on the priority level summation signal input from the priority level extractor 301.

Meanwhile, the identifier extractor 303 produces identifier signals from the generated priority level signals, decodes the produced identifier signals, and extracts identifiers of the master devices 10–17 submitting bus requests. Then, the identifier output unit 304 outputs the identifier of the master device having the priority level provided from the priority output unit 302. The arbitration circuit 29 grants the bus to the output master device identifier. The arbitration circuit 29 transmits a bus grant signal to the master device 10, 11, 12, 13, 14, 15, 16, or 17 having the output identifier. The master device 10, 11, 12, 13, 14, 15, 16, or 17 that has received the bus grant signal outputs an access command, and then the arbiter 3 transmits the received access command to the execution scheduler 4.

Then, a process of transmitting the access command in the execution scheduler 4 will now be described with reference to FIG. 6. Upon receipt of an execution completion signal from a predetermined pseudo-delayer 60, 61, 62, 63, or 64, the execution scheduling unit 46 checks whether each storage cell provided in the identifier storage queue 460 is vacant in order to check whether there is an access command to be executed. If an access command identifier is stored in the identifier storage queue 460, the execution scheduling unit 46 waits for an execution preparation completion signal to arrive from the pseudo-delayer 60, 61, 62, 63, or 64. If an execution preparation completion signal arrives from the pseudo-delayer 60, 61, 62, 63, or 64 corresponding to any one of the stored access command identifiers, then a check is made by the comparator 462 provided in each storage cell, as to whether an identifier stored in the corresponding storage cell is the same as an identifier of the slave device 20, 21, 22, 23, or 24 corresponding to the pseudo-delayer 60, 61, 62, 63, or 64, from which the execution preparation completion signal arrives. If both are the same, the comparator 462 transmits the result to the identifier storage queue controller 461, which allows the identifier of the slave device 20, 21, 22, 23, or 24 which is stored in the corresponding storage cell to be output from the identifier storage queue 460 to the decoder 463. The decoder 463 decodes the identifier output from the identifier storage queue 460 and then sends an execution starting signal to the corresponding command execution controller 50, 51, or 52, or the command storage unit 53 or 54.

Next, referring to FIG. 7, a process of transmitting the access command in the command execution controller 50 will now be described. The command execution controller 50 in this embodiment is associated with SDRAM which, for example, is the slave device 20 of FIG. 2. The command execution controller 50 holds the input commands in the order that they are input to the command storage queue 310, one command for each storage cell. The information extractor 320 extracts a memory bank address and a row address from the command stored in each storage cell as access information. The comparator 340 compares the extracted memory bank address and row address with a memory bank address and a row address stored in the register 330. If both memory bank address and row address are the same as the memory bank address and the row address stored in the register 330 as a result of comparison, the command is granted first priority. If the memory bank addresses are different from each other, the command is granted second priority.

The output order control circuit 351 controls an output order based on the priority as granted above. That is, the command having the highest priority among the commands stored in the storage cells is first output. If the commands have no priority, the commands are output in the order that they are input. The multiplexers 352 and 353 output the commands to the pseudo-layer 60 according to the output order controlled by the output order control circuit 351.

A process of controlling the output order in the output order control circuit 351 will now be described in detail. The comparator 340 compares a bank address with a row address and then outputs a resultant value represented in two bits. The resultant value is "0" if the comparison result is the same and "1" if the comparison result is different. The comparison values of a row address and a bank address are output as upper and lower bits, respectively.

The output order control circuit 351 collects the resultant values from the comparators 340 so that a comparison value with the commands of a lower storage cell may be positioned as a corresponding lower bit, and searches the resultant value of the collected 10 bits beginning with lower bits in units of two bits. In this case, the number of an interval in which "00" is found is first output, and then the number of an interval in which "01" or "11" is found is output. The multiplexers 352 and 353 output the corresponding command in the order that the number is output. For example, if comparison results with the commands stored in the storage cells (0), (1), (2), (3), and (4) is "10", "01", "10", "00" and "10" respectively, the gathered comparison result is "1000100110". The output order control circuit 351 divides the comparison result "10001001100" into five intervals by two bits, searches for an interval in which "00" exists in the order of beginning with LSB. As a result of this search, the interval in which "00" is found corresponds to the storage cell (3). The command stored in the storage cell (3) is granted first priority since it has a bank address and a row address which are the same as those of the command currently being executed. Furthermore, the interval in which "01" or "11" is found corresponds to the storage cell (1). The command stored in the storage cell (1) is granted second priority since it has a bank address which is different from that of the command currently being executed. As a consequence, the output order of the commands is storage cell (3)⇒storage cell (1)⇒storage cell (0)⇒storage cell (2) ⇒storage cell (4).

Figure 8:
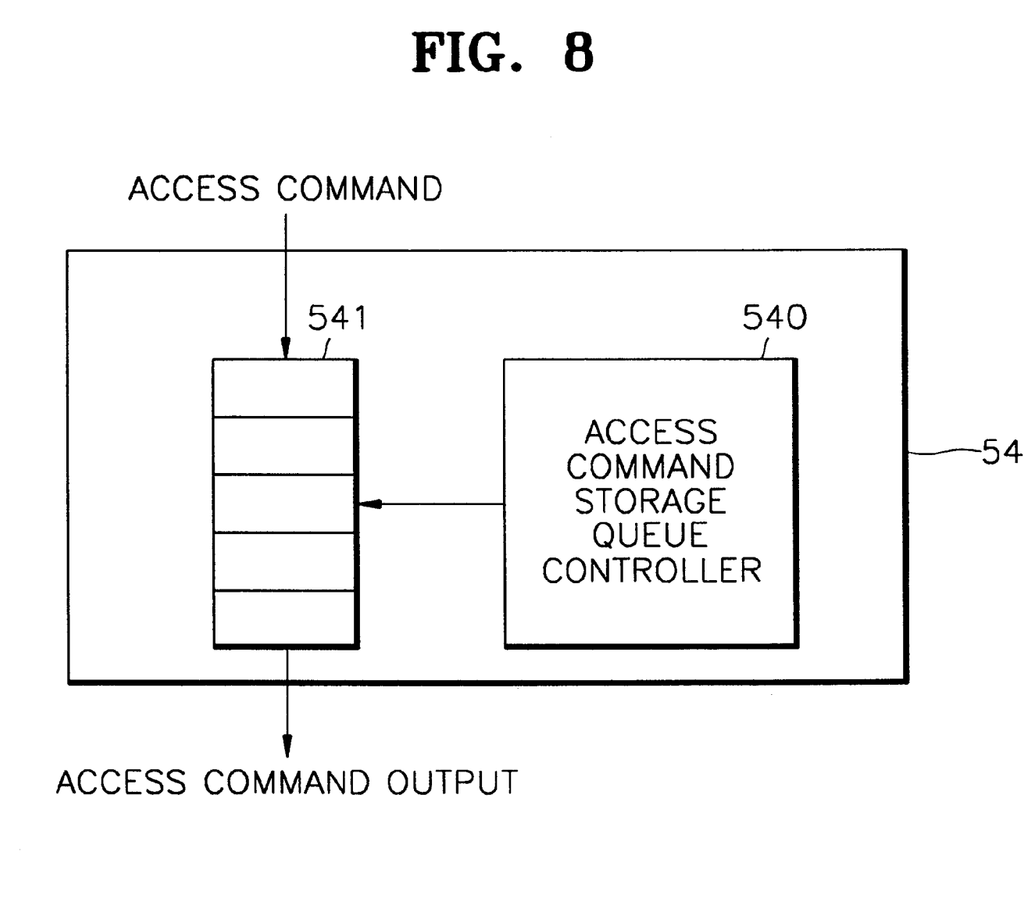
FIG. 8 is a detailed block diagram of the command storage unit of FIG. 1.

Meanwhile, a process of transmitting an access command in the command storage unit 54 will now be described with reference to a block diagram of the command storage unit 54 in FIG. 8. The transmission process in the command storage unit 53 is also the same. The command storage unit 54 includes an execution command storage queue 541 for storing access commands and an execution command storage queue controller 540 for controlling the input/output of the execution command storage queue 541. The execution command storage queue controller 540 stores access commands transmitted from the execution scheduler 4 and outputs the access commands to a corresponding pseudo-delayer 64 in the order that they are input.

Next, a process of transmitting the access commands in the pseudo-delayer 60 will now be described with reference to FIG. 5. The pseudo-delayer 60 includes the storage unit 611 in which the number of delay clock cycles corresponding to the slave 20 is stored. The pseudo-delayer 60 delivers the access command received from the command execution controller 50 to the corresponding slave device 20 after a number of delay clock cycles corresponding to the number of delay clock cycles stored in the storage unit 611 have lapsed.

The slave device 20 receives the access command and prepares data transfer. When a data transfer preparation is complete, a data transfer indication signal and an identifier of a corresponding master device 10, 11, 12, 13, 14, 15, 16, or 17 are output to the execution scheduler 4, and the execution scheduler 4 that has received the data transfer indication signal transmits the data transfer indication signal to the corresponding master device 10, 11, 12, 13, 14, 15, 16, or 17. Then, data is transferred between the slave device 20 and the corresponding master device 10, 11, 12, 13, 14, 15, 16, or 17.

The execution scheduler 4 sends a pseudo execution completion signal to the corresponding slave device 20 at the instant which is a predetermined number of clock cycles in advance of real completion of execution of the access command (completion of data transfer) output to the corresponding slave device 20.

The number of delay clock cycles is determined from a latency period of the slave device 21, 22, or 23. For example, if a corresponding latency period is 5, 6, and 4 clock cycles, the number of delay clock cycles is 1, 0, 2 clock cycle(s), respectively. That is, the number of delay clock cycles is equal to the difference between the longest latencyperiod and the latency periods of each respective slave device. In this way, the pseudo-delayer 60 serves to make the latency period of all slave devices 20–24 equal at six clock cycles. In the example described above, the number of delay clock cycles stored in the storage unit 611 is 1.

Meanwhile, if a burst length is "4, which means that data of a length "4" are consecutively transmitted, the pseudo-delayer 60 informs the execution scheduler 4 of a pseudo execution completion signal at the instant that is a latency period corresponding to six clock cycles in advance of real completion of data transfer. The execution scheduler 4 that has been informed of the pseudo execution completion sends an execution starting signal of the access command to another pseudo-delayer 61, 62, 63, or 64, which eventually begins a preparation for data transfer in the corresponding slave device 21, 22, 23, or 24 earlier thus reducing the number of idle clock cycles of a data bus.

Figure 9:
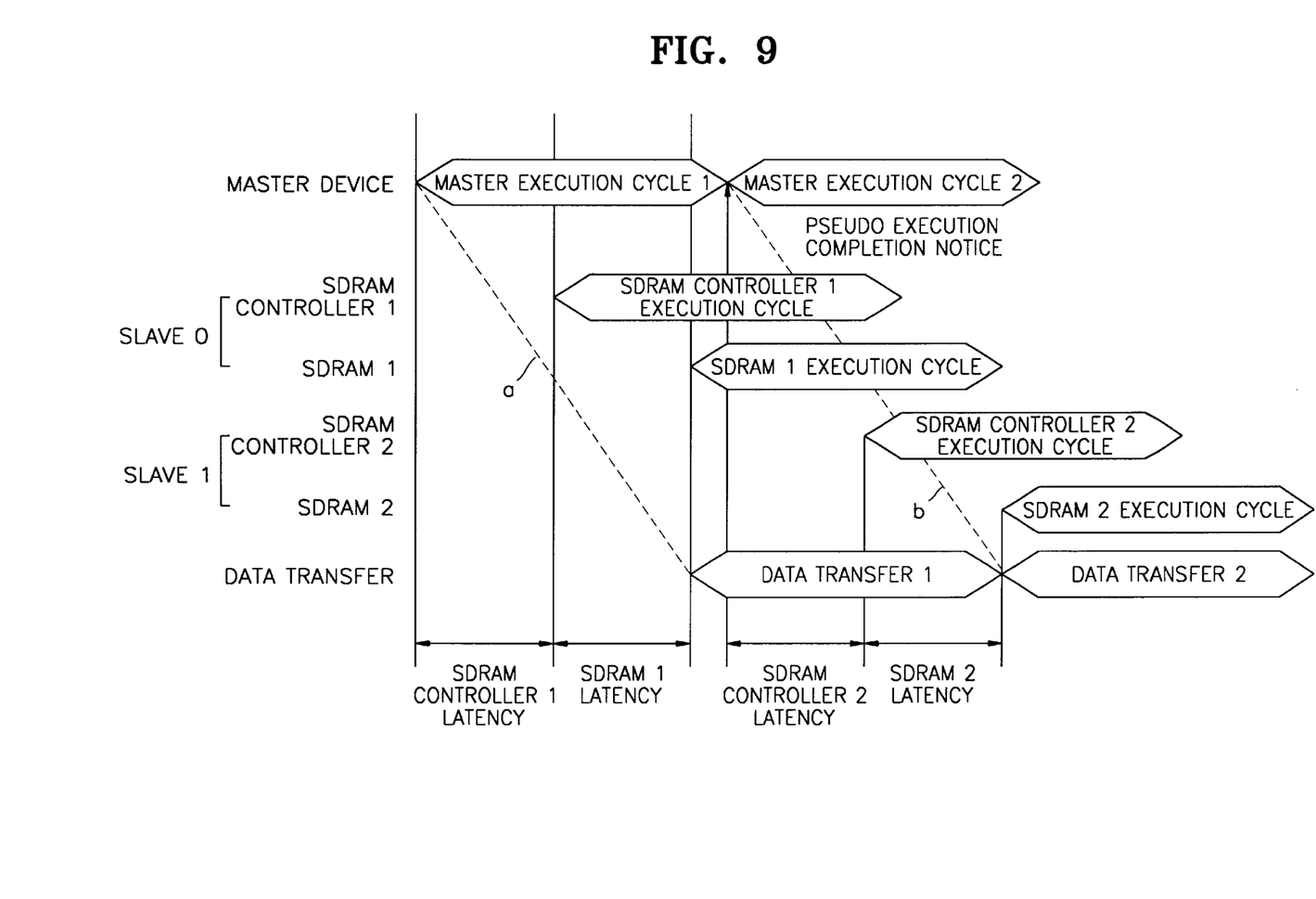
FIG. 9 is a timing diagram for explaining data transfer according to the present invention.

FIG. 9 is a timing diagram for explaining data transfer according to the present invention. Referring to FIG. 9, a first command is sent to the slave device 20, and a second command to the slave device 21. The pseudo-delayer 60 and 61 inform the slave device 21 of a pseudo execution completion at a point in time which is a latency period corresponding to a SDRAM controller latency plus a SDRAM latency in advance of the real completion of data transfer of the SDRAM. Also, the pseudo-delayers 60 and 61 send the access commands to the corresponding slave devices 20 and 21, delayed by the number of delay clock cycles required such that the latency periods of the slave devices 20 and 21 are the same. Thus, the slope "a" of a straight line connecting a "master execution cycle 1" and a "data transfer 1" is the same as the slope "b" of a straight line connecting a "master execution cycle 2" and a "data transfer 2". That is, according to the present invention, data transfer (data transfer 1) of the slave device 20 and data transfer (data transfer 2) of the slave device 21 are continuously made without idle clock cycles.

Meanwhile, whether there are only two slave devices 20 and 21 as shown in FIG. 2, or three or more slave devices, a pseudo-delayer delays and sends an access command so that all slave devices seem to have the same latency period. Unifying the latency period makes equal the slopes of straight lines connecting the output of commands by the master devices 10–17 and data transfer on a data bus, which thereby enables continuous data transfer without idle clock cycles and improves the overall system efficiency.

Since the arbiter 3 according to this invention stores priority levels designated at the input ports in corresponding registers, the priority levels can be dynamically designated by changing values stored in the registers.

Furthermore, although this embodiment of the invention has been described with reference to the case in which there are eight master devices 10–17 and sixteen priority levels, various changes in the number of master devices or priority levels can be made.

As described above, the present invention provides an arbiter of a priority designation scheme implemented with a circuit having a simple configuration without using comparators, and a bus system adopting the arbiter. Accordingly, the present invention allows for a system which can be designed without a restriction on the number of master devices, a high speed arbitration with a simple circuit configuration, and changeable priority designation.

Furthermore, the bus system allows the master device to only transmit the access command; unlike the conventional bus system in which the master device directly take controls the corresponding slave device, thereby providing for a significantly simplified bus interface structure.

The present invention controls the command execution order so that a slave device which first completes an execution preparation may first access a data bus, thereby providing a bus system having improved overall data transfer speed and an access command execution scheduling method thereof. In particular, according to the present invention, if a slave device is connected to a local data bus in which data is transferred at a slower speed than a main data bus, the slave device can effectively access the local data bus, thereby reducing idle clock cycles of the main data bus and improving the processing speed of the overall system.

Also, the present invention makes the latency period of slave devices equal, and thereby can reduce idle clock cycles of a data bus caused by different latency periods and prevent a conflict between data on the data bus. In particular, if the slave device is a memory such as SDRAM supporting pipeline transfer and performing frequent burst transmission, the number of idle clock cycles is significantly reduced, thereby improving the efficiency of a bus system. Furthermore, even in the case of ROM supporting no pipeline transfer, the pseudo-delayer according to the present invention allows for data transfer similar to pipeline transfer. That is, it is possible to execute another slave device at the instant when data transfer is not actually complete by informing a pseudo execution completion.

What is claimed is:

1. A bus system including a plurality of master devices and a plurality of slave devices, at least one of the slave devices having a latency period, the bus system comprising:
   an arbiter that receives access commands output from the plurality of master devices and outputs the access commands in an order according to a predetermined arbitration algorithm;
   an execution scheduler that receives the access commands from the arbiter and outputs the access commands in an order in which execution preparation by corresponding slave devices is completed;
   a plurality of command execution controllers corresponding to a plurality of slave devices, respectively, each command execution controller stores two or more access commands input from the execution scheduler, extracts access information necessary for execution from the stored access commands, controls the output order of the access commands based on a result of comparing the extracted access information with access information about a command currently being executed so that a total execution time of the stored commands is shorter than a total execution time according to the order in which the commands are input; and a plurality of pseudo-delayers corresponding to a plurality of slave devices, respectively, each pseudo-delayer delays and outputs one of the access commands received from the command execution controller to a corresponding slave device so that the latency period of said corresponding at least one of the plurality of slave devices may equal the longest of latency periods of the plurality of slave devices.

2. The bus system of claim 1, wherein the arbiter comprises:

a bus request receiver for receiving bus request inputs from the master devices;

a priority level extractor for outputting priority level signals indicating predesignated priority levels corresponding to the plurality of master devices if the bus requests are input through the bus request receiver, and generating a priority level summation signal indicating all priority levels of the bus requests based on the output priority level signals;

a priority output unit for outputting priority levels in order of decreasing priority based on the priority level summation signal generated by the priority level extractor;

a priority mapper for outputting identifiers of the plurality of master devices submitting bus requests, based on the priority level signals; and an arbitration circuit that grants bus access to at least one of the plurality of master devices corresponding to the identifier output from the priority mapper in order for said at least one of the plurality of master devices that is granted the bus access to output the access command.

3. The bus system of claim 2, wherein the bus request receiver is connected to the plurality of master devices.

4. The bus system of claim 2, wherein the priority mapper includes an identifier output unit for outputting identifiers of the plurality of master devices submitting bus requests, based on the priority level signals.

5. The bus system of claim 3, wherein the bus request receiver comprises a plurality of input ports connected to the plurality of master devices for receiving bus request inputs from the plurality of master devices, and a plurality of registers provided in the input ports for storing priority levels designated at the input ports.

6. The bus system of claim 4, wherein the bus request receiver comprises a plurality of input ports connected to the plurality of master devices for receiving bus request inputs from the plurality of master devices, and a plurality of registers provided in the input ports for storing priority levels designated at the input ports.

7. The bus system of claim 5, wherein the priority level signal is represented using the same number of bits as the number of priority levels.

8. The bus system of claim 6, wherein the priority level signal is represented using the same number of bits as the number of priority levels.

9. The bus system of claim 7, wherein the priority level extractor performs an OR operation on one or more priority level signals on a bit-by-bit basis and generates the priority level summation signal represented in the same number of bits as said one or more priority level signals.

10. The bus system of claim 8, wherein the priority level extractor performs an OR operation on one or more priority level signals on a bit-by-bit basis and generates the priority level summation signal represented in the same number of bits as said one or more priority level signals.

11. The bus system of claim 4, wherein the master device identifier output unit comprises:

an identifier extractor that generates an identifier signal by extracting a bit column, including a bit indicating a priority level, requested from a matrix constructed of the priority level signals, and extracts a corresponding master device identifier based on the generated identifier signal; and an identifier output unit that outputs an identifier of one of said plurality of master devices having the priority level output from the priority output unit, wherein said identifier is one of the identifiers extracted by the identifier extractor.

12. The bus system of claim 11, wherein the identifier extractor comprises decoders that receive input identifier signals and extract corresponding master device identifiers.

13. The bus system of claim 1, wherein the execution scheduler comprises:

an access command distributor that receives the access commands output from the arbiter and transmits the access commands to the corresponding command execution controllers; and an execution scheduling unit that send outs an execution starting signal of one of the transmitted access commands to the command execution controller corresponding to the pseudo-delayer that has received an execution preparation completion signal, wherein said pseudo-delayer that has received an execution preparation completion signal is one of the pseudo-delayers that have received the access commands from the access command distributor.

14. The bus system of claim 13, wherein the execution scheduling unit comprises:

an identifier storage queue, including one or more storage cells, for storing an identifier of a corresponding slave device receiving the access command through the access command distributor and an identifier storage queue controller for controlling the identifier storage queue;

comparators, each of which corresponds to a respective storage cell, for determining whether or not an identifier stored in the storage cell is the same as an identifier of the slave device transmitting the execution preparation completion signal; and a decoder for transmitting the execution starting signal to the pseudo-delayer that has received the execution preparation completion signal, if both identifiers are determined to be the same by the comparator.

15. The bus system of claim 14, wherein the access command distributor comprises a command storage queue for storing the access commands received from the arbiter and a command storage queue controller for controlling the command storage queue.

16. The bus system of claim 13, wherein each command execution controller comprises:

a command holder for storing two or more access commands received from the access command distributor;

an access information extractor for extracting access information for execution from the access commands stored in the command holder;

an execution access information storage unit for storing access information about an access command currently being executed by at least one of the plurality of slave devices;

a comparison unit for comparing the access information extracted by the access information extractor with access information stored in the execution access information storage unit; and an output order controller that controls an output order of the access commands stored in the command holders based on the comparison result from the comparison unit so that a total execution time of the stored commands is shorter than a total execution time according to the order in which the commands are stored, and outputs the access commands to at least one of the pseudo-delayers according to the controlled output order.

17. The bus system of claim 16, wherein the command holder comprises a command storage queue including a plurality of storage cells for storing the access commands, wherein the access information extractor comprises a plurality of information extractors for extracting the access information, wherein the execution access information storage unit comprises a register for storing the access information about the access command currently being executed, wherein the comparison unit comprises a plurality of comparators for comparing the access information extracted by the access information extractor with the access information stored in the register, and wherein the output order controller comprises an output order control circuit for controlling an output order according to priority that is granted based on the comparison results from the comparators, and a multiplexer for outputting the access commands stored in the command holder according to the output order from the output order control circuit.

18. The bus system of claim 17, wherein each of the plurality of information extractors for extracting the access information corresponds to a respective one of the plurality of storage cells, and wherein each register corresponds to each access information extractor, respectively.

19. The bus system of claim 17, wherein the access information includes a bank address and a row address, and wherein the comparison unit compares a bank address and a row address extracted by each information extractor with a bank address and a row address stored in the register.

20. The bus system of claim 18, wherein the access information includes a bank address and a row address, and wherein the comparison unit compares a bank address and a row address extracted by each information extractor with a bank address and a row address stored in the register.

21. The bus system of claim 19, wherein the output order control circuit grants first priority to the access command whose bank address and row address are the same as those stored in the register as a result of the comparison.

22. The bus system of claim 20, wherein the output order control circuit grants first priority to the access command whose bank address and row address are the same as those stored in the register as a result of the comparison.

23. The bus system of claim 21, wherein the output order control circuit grants second priority to the access command whose bank address is different from that which is stored in the register as a result of the comparison.

24. The bus system of claim 22, wherein the output order control circuit grants second priority to the access command whose bank address is different from that which is stored in the register as a result of the comparison.

25. The bus system of claim 16, wherein the access information further includes a burst length which is the bit length of burst transmission data.

26. The bus system of claim 1, wherein each pseudo-delayer includes a storage unit for storing a number of delay clock cycles which correspond to a difference between the longest of the latency periods and the latency period of each of the plurality of slave devices, respectively, receiving the access command from the corresponding command execution controller, and transmitting the access command to the corresponding one of the plurality of slave devices after a number of delay clock cycles corresponding to a number stored in the storage unit have lapsed.

27. A bus system including a plurality of master devices and a plurality of slave devices, at least one of the slave devices having a latency period, the bus system comprising:

an arbiter that receives access commands output from the plurality of master devices and outputs the access commands in an order according to a predetermined arbitration algorithm;

an execution scheduler that receives the access commands from the arbiter and outputs the access commands in an order in which execution preparation by corresponding slave devices are complete;

a plurality of command storage units corresponding to the plurality of slave devices, each of the command storage units storing one or more access commands received from the execution scheduler and outputting the access commands in the order that the commands are input; and a plurality of pseudo-delayers provided corresponding to at least one of the slave devices, respectively, each pseudo-delayer delays and outputs the access command received from the command storage unit to a corresponding slave device so that the latencyperiod of the corresponding slave device may equal the longest of latency periods of the plurality of slave devices.

28. The bus system of claim 27, wherein the arbiter comprises:

a bus request receiver for receiving bus request inputs from the plurality of master devices;

a priority level extractor for outputting priority level signals indicating predesignated priority levels corresponding to the master devices if the bus requests are input through the bus request receiver, and generating a priority level summation signal indicating all priority levels of the bus requests based on the output priority level signals;

a priority output unit for outputting priority levels in order of decreasing priority based on the priority level summation signal generated by the priority level extractor;

a priority mapper for outputting identifiers of the master devices submitting bus requests based on the priority level signals; and an arbitration circuit that grants bus access to the master device having the identifier output from the priority mapper in order for the master device that was granted the bus access to output the access command.

29. The bus system of claim 28, wherein the bus request receiver is connected to the plurality of master devices.

30. The bus system of claim 28, wherein a priority mapper includes an identifier output unit for outputting identifiers of the plurality of master devices submitting bus requests based on the priority level signals.

31. The bus system of claim 29, wherein the bus request receiver comprises a plurality of input ports connected to the plurality of master devices for receiving bus request inputs from the master devices, and a plurality of registers provided in the input ports for storing priority levels designated at the input ports.

32. The bus system of claim 31, wherein the priority level signal is represented using the same number of bits as the priority level.

33. The bus system of claim 32, wherein the priority level extractor performs an OR operation on one or more priority level signals on a bit-by-bit basis and generates the priority level summation signal represented in the same number of bits as the priority level signal.

34. The bus system of claim 28, wherein the master device identifier output unit comprises:

an identifier extractor that generates an identifier signal by extracting a bit column, including a bit indicating a priority level, requested from a matrix constructed of the priority level signals, and extracts a corresponding master device identifier based on the generated identifier signal; and an identifier output unit that outputs an identifier of one of the plurality of master devices having the priority level output from the priority output unit, wherein said identifier is one of the identifiers extracted by the identifier extractor.

35. The bus system of claim 29, wherein the master device identifier output unit comprises:

an identifier extractor that generates an identifier signal by extracting a bit column, including a bit indicating a priority level, requested from a matrix constructed of the priority level signals, and extracts a corresponding master device identifier based on the generated identifier signal; and an identifier output unit that outputs an identifier of one of the plurality of master devices having the priority level output from the priority output unit, wherein said identifier is one of the identifiers extracted by the identifier extractor.

36. The bus system of claim 30, wherein the master device identifier output unit comprises:

an identifier extractor that generates an identifier signal by extracting a bit column, including a bit indicating a priority level, requested from a matrix constructed of the priority level signals, and extracts a corresponding master device identifier based on the generated identifier signal; and an identifier output unit that outputs an identifier of one of the plurality of master devices having the priority level output from the priority output unit, wherein said identifier is one of the identifiers extracted by the identifier extractor.

37. The bus system of claim 34, wherein the identifier extractor comprises decoders that receive input identifier signals and extract corresponding master device identifiers.

38. The bus system of claim 37, wherein the execution scheduler comprises:

an access command distributor that receives the access commands output from the arbiter, and transmits the access commands to the corresponding command storage unit; and an execution scheduling unit that send outs an execution starting signal of one of the transmitted access commands to the command storage unit corresponding to the pseudo-delayer that has received an execution preparation completion signal, wherein said pseudo-delayer that has received an execution preparation completion signal is one of the pseudo-delayers that have received the access commands from the access command distributor.

39. The bus system of claim 38, wherein the execution scheduling unit comprises:

an identifier storage queue, including one or more storage cells, for storing an identifier of a corresponding slave device receiving the access command through the access command distributor and an identifier storage queue controller for controlling the identifier storage queue;

comparators for determining whether or not a first identifier stored in the storage cell is the same as a second identifier of the slave device transmitting the execution preparation completion signal; and a decoder for transmitting the execution starting signal to the pseudodelayer, which has received the execution preparation completion signal, if the first identifier and the second identifier are determined to be the same by the comparator.

40. The bus system of claim 39, wherein each of the comparators correspond to a respective one of the storage cells.

41. The bus system of claim 39, wherein the access command distributor comprises a command storage queue for storing the access commands received from the arbiter and a command storage queue controller for controlling the command storage queue.

42. The bus system of claim 27, wherein each command storage unit comprises an execution command storage queue for storing the access commands and an execution command storage queue controller for controlling the execution command storage queue.

43. The bus system of claim 27, wherein each pseudo-delayer includes a storage unit for storing a number of delay clock cycles which correspond to a difference between the longest of the latency periods and the latency period of each one of the plurality of slave devices, receives the access command from the corresponding command storage unit, and transmits the access command to a corresponding slave device after the number of delay clock cycles corresponding to a number stored in the storage unit have lapsed.

* * * * *